(12) United States Patent
Rozenberg et al.

(10) Patent No.: US 7,677,006 B2
(45) Date of Patent: Mar. 16, 2010

(54) MODULAR STRUCTURES AND PANELS FOR CONSTRUCTING THEM

(76) Inventors: Stephen Rozenberg, 182-19 80$^{th}$ Dr., Jamaica Estates, NY (US) 11432; James S. Zumpone, 159-17 66$^{th}$ Ave., Fresh Meadows, NY (US) 11365

( * ) Notice: Subject to any disclaimer, the term of this patent is extended or adjusted under 35 U.S.C. 154(b) by 1398 days.

(21) Appl. No.: 10/475,249

(22) PCT Filed: Apr. 17, 2002

(86) PCT No.: PCT/US02/12179

§ 371 (c)(1),
(2), (4) Date: Oct. 17, 2003

(87) PCT Pub. No.: WO02/084448

PCT Pub. Date: Oct. 24, 2002

(65) Prior Publication Data

US 2004/0111983 A1 Jun. 17, 2004

Related U.S. Application Data

(60) Provisional application No. 60/284,342, filed on Apr. 17, 2001.

(51) Int. Cl.
*E04B 2/00* (2006.01)
(52) U.S. Cl. .............. 52/582.2; 52/79.1; 52/588.1; 52/589.1
(58) Field of Classification Search .......... 52/578, 52/582.1, 588.1, 589.1, 586.1, 285.4, 238.1, 52/240, 582.2, 79.1, 239, 241, 243.1, 282.1, 52/282.4, 579; 403/286, 292; 292/303, 10, 292/19, 80, 88, DIG. 61
See application file for complete search history.

(56) References Cited

U.S. PATENT DOCUMENTS

| | | | | |
|---|---|---|---|---|
| 3,550,898 A | * | 12/1970 | Citrullo et al. | 249/195 |
| 4,676,039 A | * | 6/1987 | Leiter et al. | 52/282.4 |
| 4,677,797 A | * | 7/1987 | Roth | 52/94 |
| 4,891,921 A | | 1/1990 | Governale | |
| 5,483,778 A | * | 1/1996 | Scrivener | 52/579 |
| 5,513,471 A | | 5/1996 | Worms et al. | |
| 5,687,859 A | * | 11/1997 | Miller | 211/189 |
| 5,857,304 A | * | 1/1999 | Karten et al. | 52/582.1 |
| 5,884,647 A | * | 3/1999 | Dwek | 135/144 |
| 6,105,322 A | * | 8/2000 | Chang | 52/238.1 |
| 6,119,427 A | * | 9/2000 | Wyman et al. | 52/584.1 |
| 2002/0088188 A1 | * | 7/2002 | Chang | 52/238.1 |

* cited by examiner

*Primary Examiner*—Richard E Chilcot, Jr.
*Assistant Examiner*—William V Gilbert
(74) *Attorney, Agent, or Firm*—Cohen Pontani Lieberman & Pavane LLP

(57) ABSTRACT

A connector assembly for use in a modular structure is intended for temporary usage, and may be assembled and disassembled conveniently. The connector assembly includes a slidable bolt partly mounted within a first panel and slidable from a first position completely within that first panel to a second position partially within an adjacent second panel. Furthermore, the first panel has one male channel and one female channel, adapted to mate with the male channel on an adjacent panel. The male channel may slide into the female channel laterally i.e., without the need for lifting, or rotating either panel into place. At each corner, the structure includes a corner post which emulates the channel into which the sliding bolt moves and permits the securing of panels thereto. In addition, the structure may be mountable to an existing permanent structure by providing special brackets, which emulate the mating structure of adjacent panels.

50 Claims, 16 Drawing Sheets

MODULAR STRUCTURES AND PANELS FOR CONSTRUCTING THEM

CROSS-REFERENCE TO RELATED APPLICATION

This application is a continuation-in-part of my prior filed U.S. Provisional Application Ser. No. 60/284,342, filed on Apr. 17, 2001.

FIELD OF THE INVENTION

This application is directed to temporary structures, and, in particular to a modular structure which may be assembled and disassembled easily and conveniently for temporary usage.

DESCRIPTION OF THE RELATED ART

There is a common need for temporary structures of various kinds. For example, scientists may need to prepare temporary camp sites for extended study of fauna in the wild, the military may need to establish forward bases in hostile territory, and individuals may need to utilize temporary structures for various personal reasons. Once such personal reason is the observance of the Jewish holiday of Succoth, which requires observant Jews to construct a special structure, known as a Succah, during the annual holiday celebration.

Many different types of temporary Succah assemblies are well-known. They all, however, suffer from various drawbacks. For example, U.S. Pat. No. 4,676,039 to Leiter et al. discloses a temporary structure assembly with a particular panel structure useful in creating a Succah. The assembly used to connect adjacent panels, however, is complicated, and requires that the adjacent panels be connected by rotating one of the panels into place and then sliding a connecting piece downward from the top of the structure to lock the panels in place. This may be difficult to perform where the panels are relatively high and the user is relatively short. In addition, the assembly of the structure requires the use of a corner piece which must be slid into place completely from the top of the structure, complicating the act of assembly.

A further type of temporary structure is disclosed in U.S. Pat. No. 5,857,304 to Karten et al. which discloses a slidable locking system for disengageable panels and means for connecting adjacent panels and lining up the tops thereof for use in a modular display system. The structure, however, does not constitute a complete enclosed structure and also requires the sliding of panels with respect to one another. In other words, it is necessary for one panel to be placed above the other panel so that they may be slid into place. This can be difficult to accomplish, for many users and requires a dexterity which not all users may have. Other temporary structures are shown in, for example, U.S. Pat. Nos. 5,884,647 and 4,677,797. The structures disclosed therein are also complicated and difficult to assemble.

There is therefore a need in the art for a simple system for constructing a temporary structure, capable of easy assembly by persons not possessing a high degree of manual dexterity or strength.

SUMMARY OF THE INVENTION

It is therefore an object of the invention to provide a modular structure and connecting assembly therefor which is easier to assemble than are known devices.

It is a further object of the invention to provide a modular structure which may be easily assembled without the use of many small additional pieces.

The invention is directed to a connector assembly for use in a modular structure intended for temporary usage, and may be assembled and disassembled conveniently. The connector assembly includes a slidable bolt partly mounted within a first panel and slidable from a first position completely within that first panel to a second position partially within an adjacent second panel. The first panel has one male channel and one female channel, adapted to mate with the male channel on an adjacent panel. The male channel may slide into the female channel laterally, i.e., without the need for lifting, or rotating either panel into place. At each corner, the structure includes a corner post which emulates the channel into which the sliding bolt moves and permits the securing of panels thereto. In addition, the structure may be mountable to an existing permanent structure by providing special brackets, which emulate the mating structure of adjacent panels.

Other objects and features of the present invention will become apparent from the following detailed description considered in conjunction with the accompanying drawings. It is to be understood, however, that the drawings are designed solely for purposes of illustration but not as a definition of the limits of the invention for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference numerals designate like elements throughout the general views.

DETAILED DESCRIPTION OF THE PRESENTLY PREFERRED EMBODIMENTS

Figure 1:
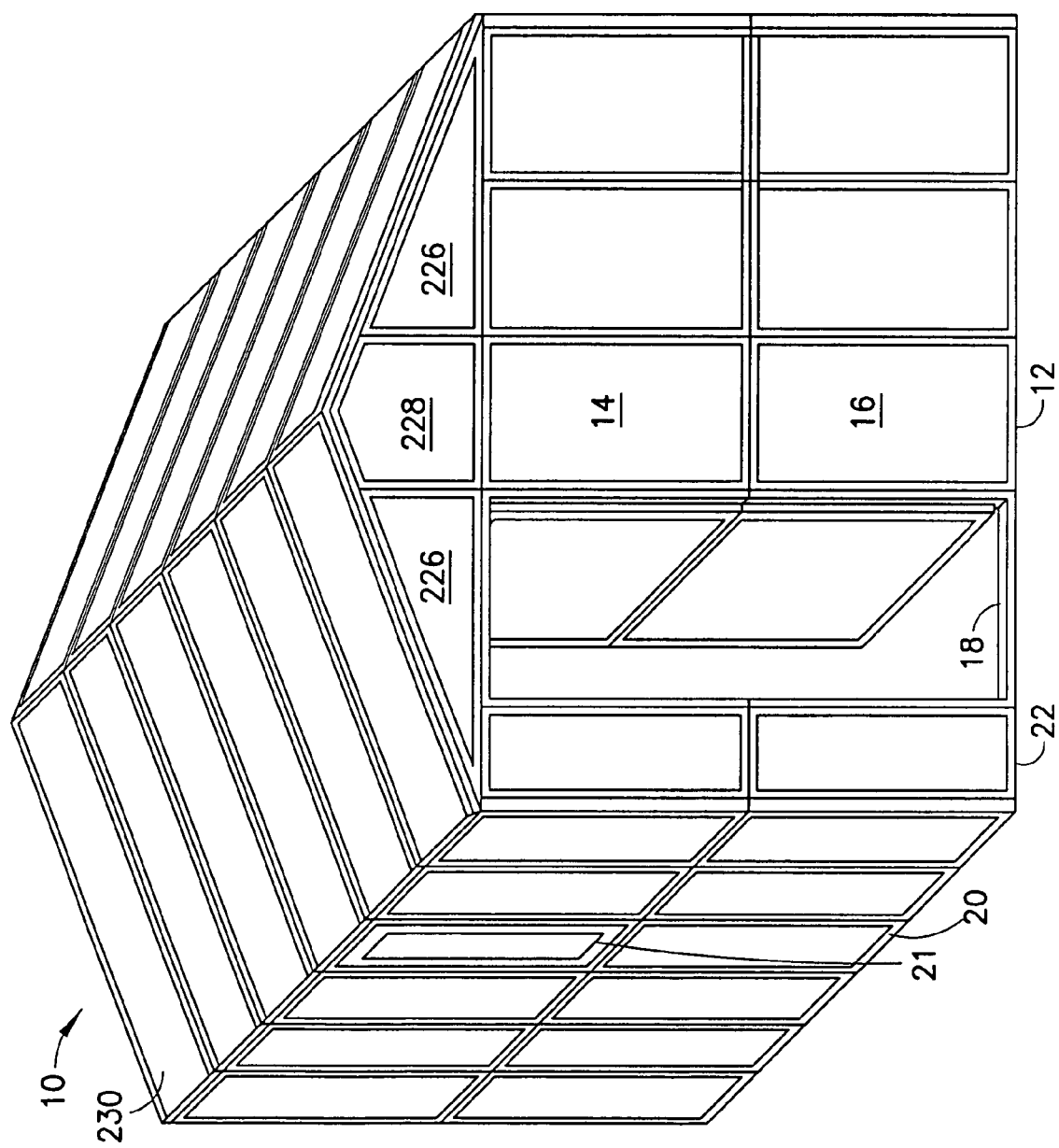
FIG. 1 is a perspective of a modular structure in accordance with the invention.

A modular structure 10 in accordance with the invention is shown in FIG. 1. Structure 10 includes a plurality of substantially identical panels 12, preferably approximately two feet wide by seven feet tall. Each panel 12 includes an upper sub-panel 14, and a lower sub-panel 16, each approximately two feet wide by three and one-half feet tall. Structure 10 may also include a door panel 18 and one or more window panels 20 having a window 21. As may be seen in FIG. 1, door panel 18 is larger than standard panels 12, preferably about three feet wide, to allow for ease of passage therethrough, in which case a reduced width panel 22 may be provided, to balance out the side of structure 10 having a door panel 18 therein.

Figure 2:
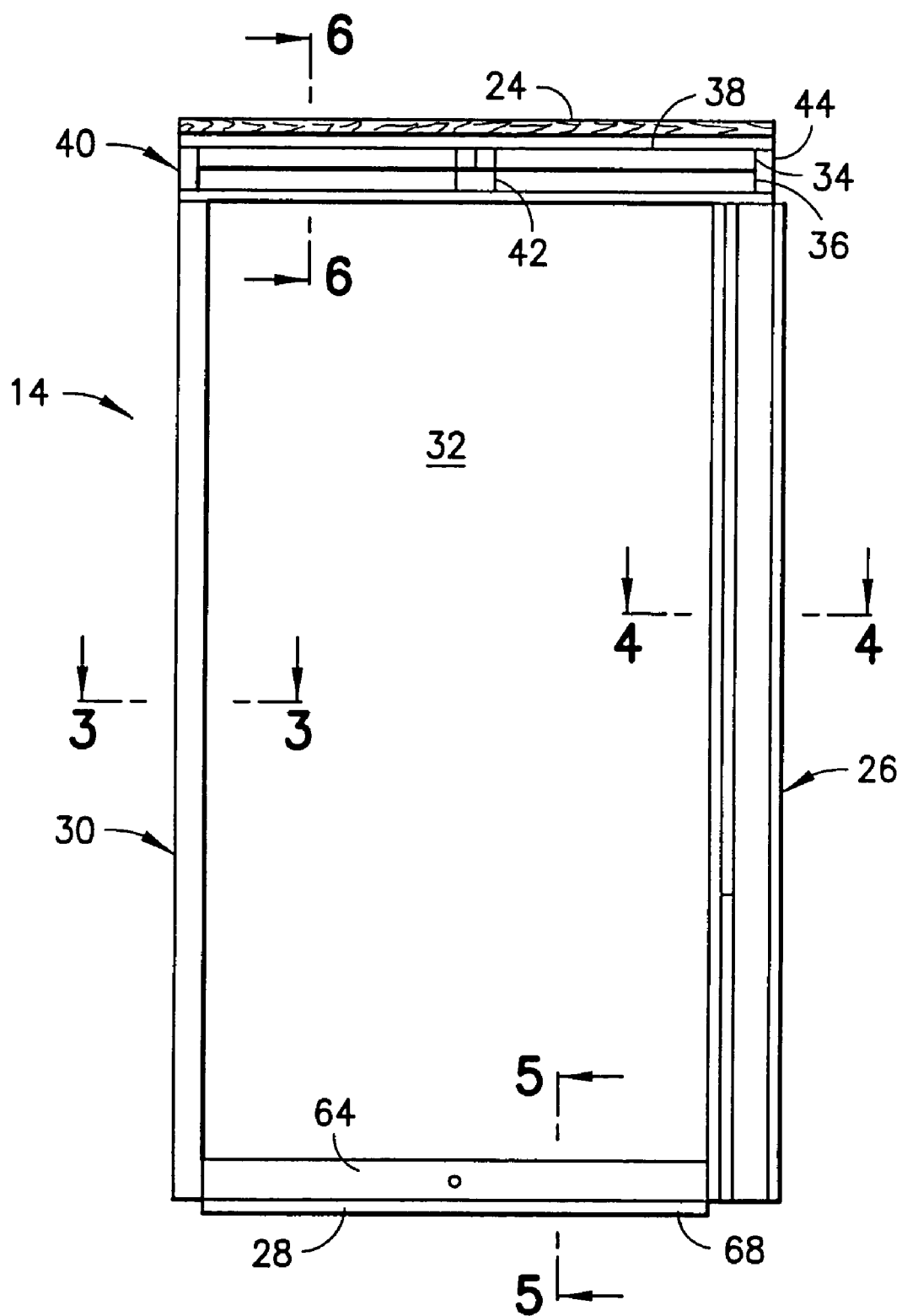
FIG. 2 is a plan view of an upper sub-panel of the modular structure of FIG. 1, shown from the inside of the structure.

Upper sub-panel 14 is shown separately in FIG. 2, as viewed from the inside of structure 10. Upper sub-panel 14 preferably has a generally rectangular shape, with a top side 24, a right side 26, a bottom side 28, and a left side 30. A generally flat sheet 32 of relatively rigid material, such as a rigid plastic, is retained within the four sides 24, 26, 28 and 30. If desired, flat sheet 32 could include a window, such as window 20, as shown in FIG. 1. Top side 24 includes an upper channel 34 and a lower channel 36, each formed to receive a sliding bar 38. Sliding bar 38 generally resides in only one of the two channels 34 and 36. Preferably, it usually resides in upper channel 34, although that is a mere matter of design choice. Sliding bar 38 is preferably approximately two feet long, i.e. it is as long as upper sub-panel 14 is wide, for reasons that will be described presently.

Channels 34 and 36 are each preferably defined by three support elements: left support element 40, center support element 42 and right support element 44. Each channel 34 and 36 is adapted to align with a respective channel (not shown in FIG. 2) of an adjacent panel, so that when each panel 12 is in place within structure 10, sliding bar 38 may move from a first position substantially completely within a first panel 12 into an adjacent panel.

Figure 3:
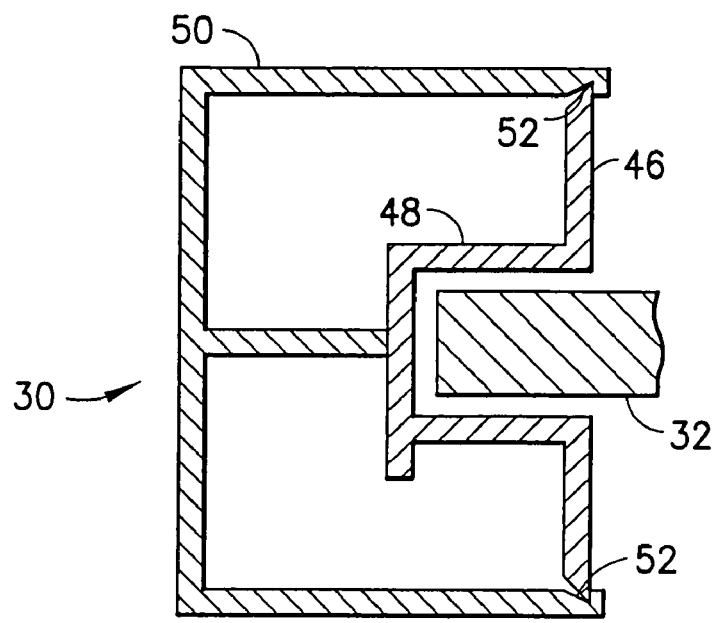
FIG. 3 shows cross-sectional detail of the left side of the upper sub-panel of FIG. 2, taken along the direction of arrows 3-3 in FIG. 2.

A cross-section of left side 30 of upper sub-panel 14 is shown in FIG. 3. Left side 30 comprises a first adapter 46 which has a securing channel 48 to grip the left exterior edge of flat sheet 32. First adapter 46 is shaped to be secured into a male channel 50, for example by snapping into notches 52 therein. Male channel 50 has a generally rectangular cross-section shape when viewed from the end, as shown in FIG. 3.

The profile of securing channel 48 of first adapter 46 may be varied depending upon the nature of flat sheet 32, so that it has a profile that will accommodate the thickness of flat panel 32 in the desired environment. Left side 30 is generally referred to herein as the "male" side of upper sub-panel 14.

Figure 4:
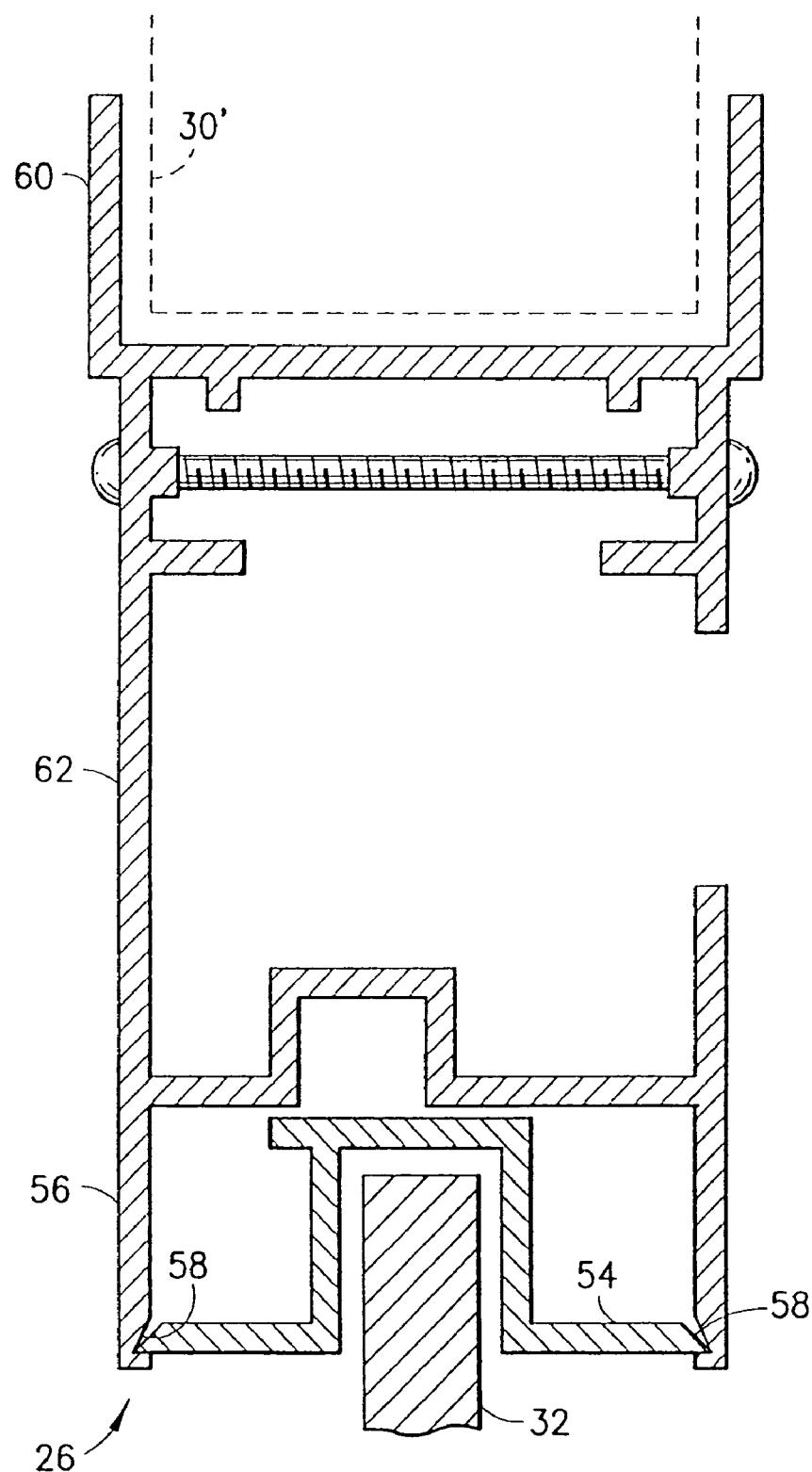
FIG. 4 shows a cross-sectional detail of the right side of the upper sub-panel of FIG. 2, taken along the direction of arrows 4-4 in FIG. 2.

A cross-section of right side 26 of upper sub-panel 14 is shown in FIG. 4. Right side 26 comprises a second adapter 54, substantially identical to first adapter 46 of left side 30, for gripping the right exterior edge of flat sheet 32. Second adapter 54 is adapted to be secured into an interior channel 56, for example by snapping into notches 58 therein. Right side 26 further comprises an exterior channel 60, which is configured to receive a male channel (shown in phantom in FIG. 4 as 30') of an adjacent upper sub-panel. Right side 26 further comprises an intermediate channel 62 disposed between interior channel 56 and exterior channel 60. Right side 26 is generally referred to herein as the "female" side of upper sub-panel 14.

Figure 5:
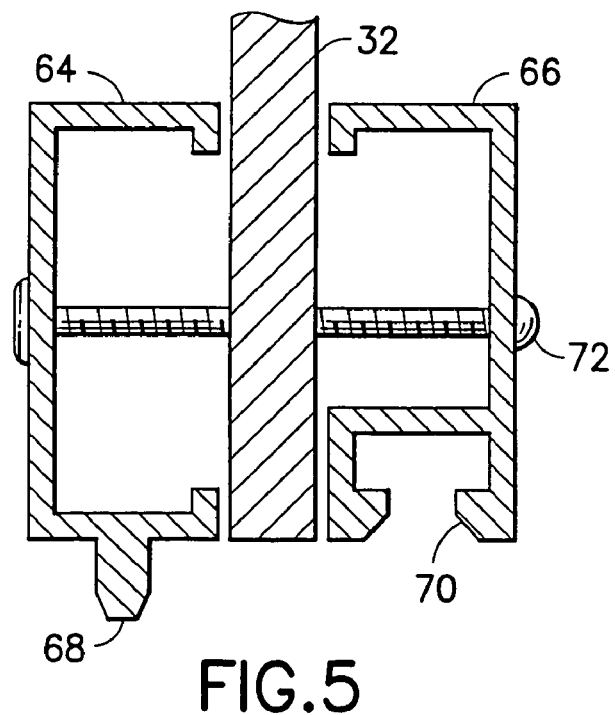
FIG. 5 shows a cross-sectional detail of the bottom side of the upper sub-panel of FIG. 2, taken along the direction of arrows 5-5 in FIG. 2.

A cross-section of bottom side 28 of upper sub-panel 14 is shown in FIG. 5. A bottom exterior edge of flat sheet 32 is gripped between first and second alignment portions 64 and 66, respectively. In a preferred embodiment, first alignment portion 64 has a tongue 68, and second alignment portion 66 has a groove 70 shaped to mate with a corresponding tongue 68 of a lower sub-panel 16. First alignment portion 64, flat sheet 32 and second alignment portion 66 may be attached in any desired fashion, for example by a rivet 72.

Figure 6:
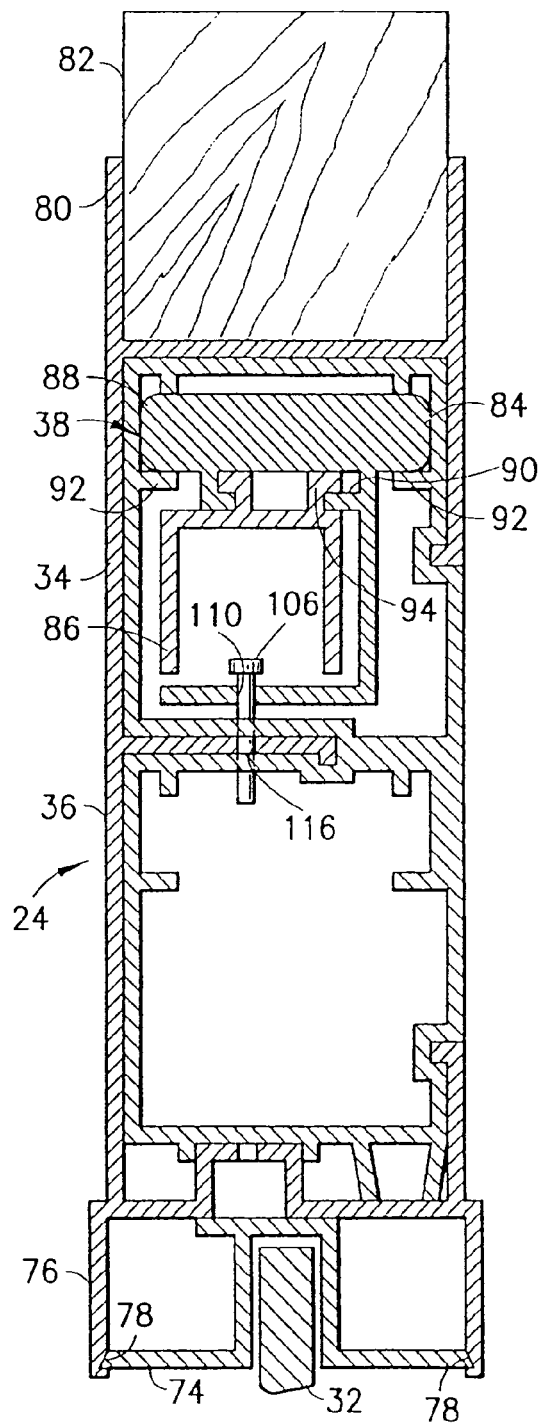
FIG. 6 shows a cross-sectional detail of the top side of the upper sub-panel of FIG. 2, taken along the direction of arrows 6-6 in FIG. 2.

A cross-section of upper side 24 of upper sub-panel 14 is shown in FIG. 6. Upper side 24 comprises a first adapter 74 substantially identical to first adapter 46 of left side 30, for gripping the top exterior edge of flat sheet 32. First adapter 74 is adapted to be secured into an interior channel 76 of top side 24, for example by snapping into notches 78 therein. An exterior channel 80 is opposite interior channel 76. In a preferred embodiment, a wooden piece 82 may be disposed in exterior channel 80 to comply with Jewish laws regarding the proper structure of a Succah such as may be used for Succoth.

Upper channel 34 and lower channel 36 are disposed between interior channel 76 and exterior channel 80. Upper channel 34 and lower channel 36 are substantially identical, except that sliding bar 38 is usually disposed in upper channel 34, as stated above. Sliding bar 38 is shown in detail in FIGS. 7 and 8. Sliding bar 38 includes two interlocking members, a U-channel slide member 84, and a sliding lock channel member 86 slidably disposed therein. U-channel slide member 84 has an upper shoulder portion 88, and a pair of L-shaped fingers 90 disposed underneath upper shoulder portion 88. As shown in FIG. 6, upper shoulder portion 88 is supported by a pair of opposed fingers 92 on the interior of upper channel 34, to permit sliding movement of sliding bar 38 in upper channel 34. Sliding lock channel member 86 includes a pair of L-shaped fingers 94 configured to engage and rest upon L-shaped fingers 90 of U-shaped slide member 84. The engagement of L-shaped fingers 94 of sliding lock channel member 86 with L-shaped fingers 90 of U-shaped slide member 84 renders these two members relatively slidable.

Figure 7:
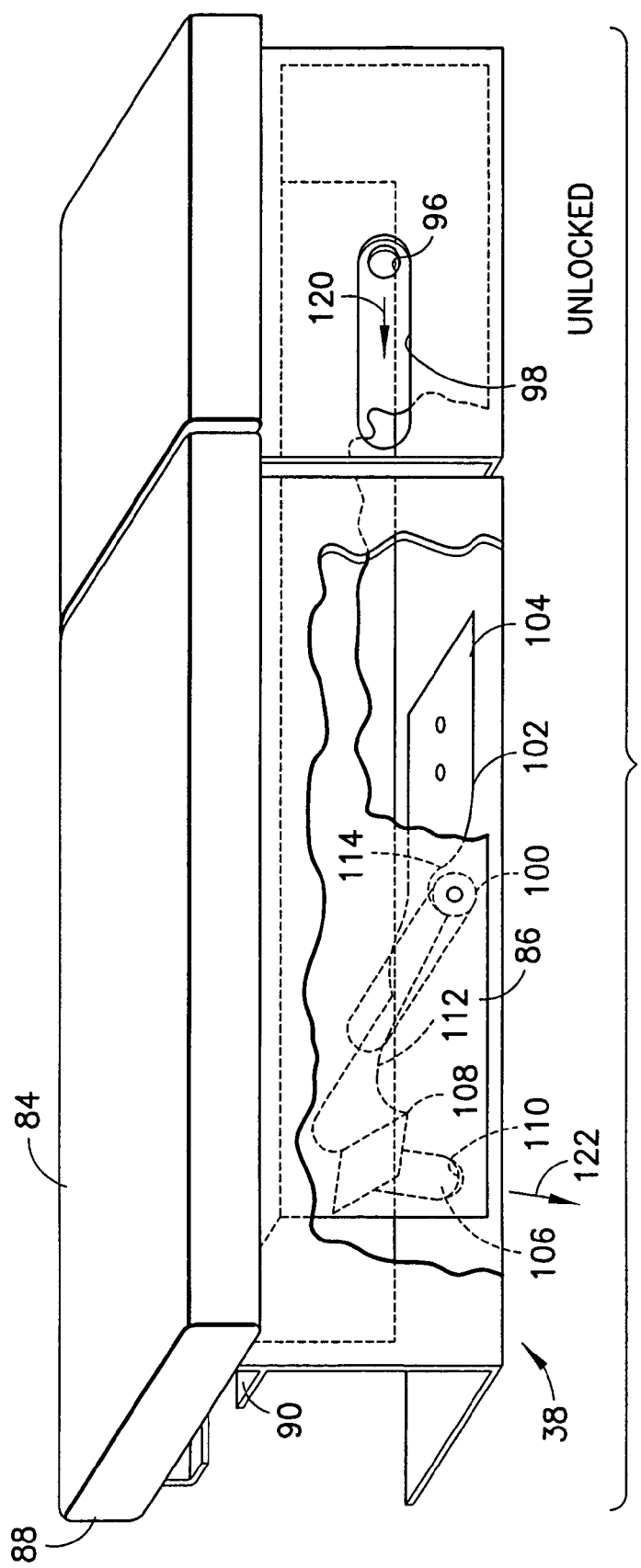
FIG. 7 is a perspective of the sliding bar of FIG. 2, shown in partial breakaway and partial phantom, in its unlocked position.
Figure 8:
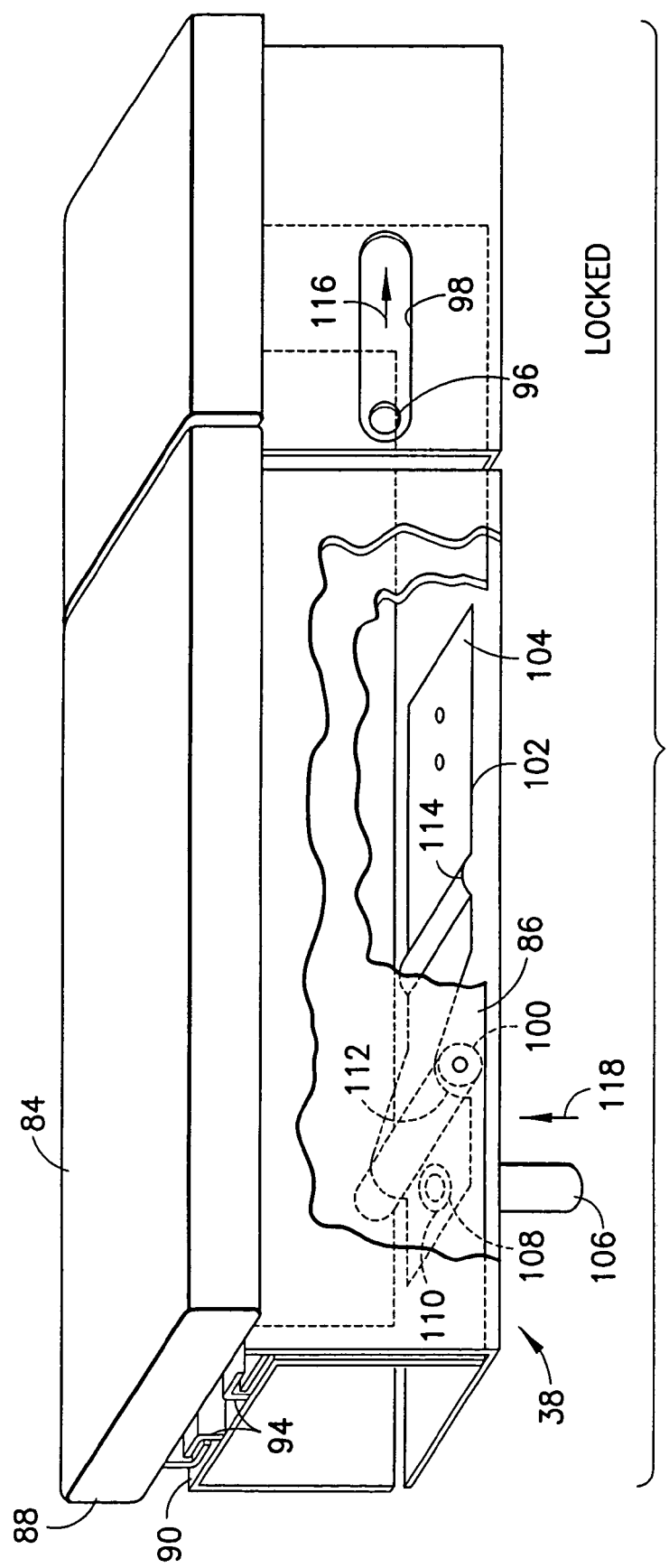
FIG. 8 is a perspective of the sliding bar of FIG. 2, shown in partial breakaway and partial phantom, in its locked position.

Referring to FIGS. 7 and 8, a keyhole 96 in sliding lock channel member 86 is disposed adjacent a slot 98 in U-channel slide member 84 so that a user may actuate the relative sliding movement between U-channel slide member 84 and sliding lock channel member 86 by inserting a key (not shown) in keyhole 96, and then using the key to slide sliding lock channel member 86 along slot 98. The key may be any functional item, such as a screwdriver, a dedicated key which is specifically shaped to mate with keyhole 96 or even a pencil if nothing else is at hand, so long as the key fits in keyhole 96 and is strong enough to cause U-channel slide member 84 to slide. In a preferred embodiment, a pair of bars 100 (only one shown in FIGS. 7 and 8, and both omitted from FIG. 6 for clarity) extend across sliding lock channel member 86. In other embodiments, different numbers of bars 100, such as one or three, may be used as a matter of design choice.

U-channel slide member 84 further includes a pair of ribbon springs 102 (only one shown in FIGS. 7 and 8, and both omitted from FIG. 6 for clarity) each affixed at a rear end 104 thereof to the bottom interior of U-channel slide member 86. A post 106 is affixed to a forward end 108 of each ribbon spring 102, and disposed within a hole 110 in the bottom of U-channel slide member 86. Each ribbon spring 102 includes a forward bump 112 and a rearward bump 114.

Each bar 100 is disposed to contact a respective ribbon spring 102, and each ribbon spring 102 is configured so that when bar 100 rests in forward bump 112, as shown in FIG. 8, post 106 extends outward through hole 110 in the bottom of U-shaped channel member 84, and when bar 100 rests in rearward bump 114, post 106 is retracted into an unlocked position within U-shaped channel member 84 as shown in FIG. 7. Referring again to FIG. 6, upper channel 34 includes holes 116 (only one is shown) configured to receive post 106 in various positions, as will be explained presently.

Figure 9:
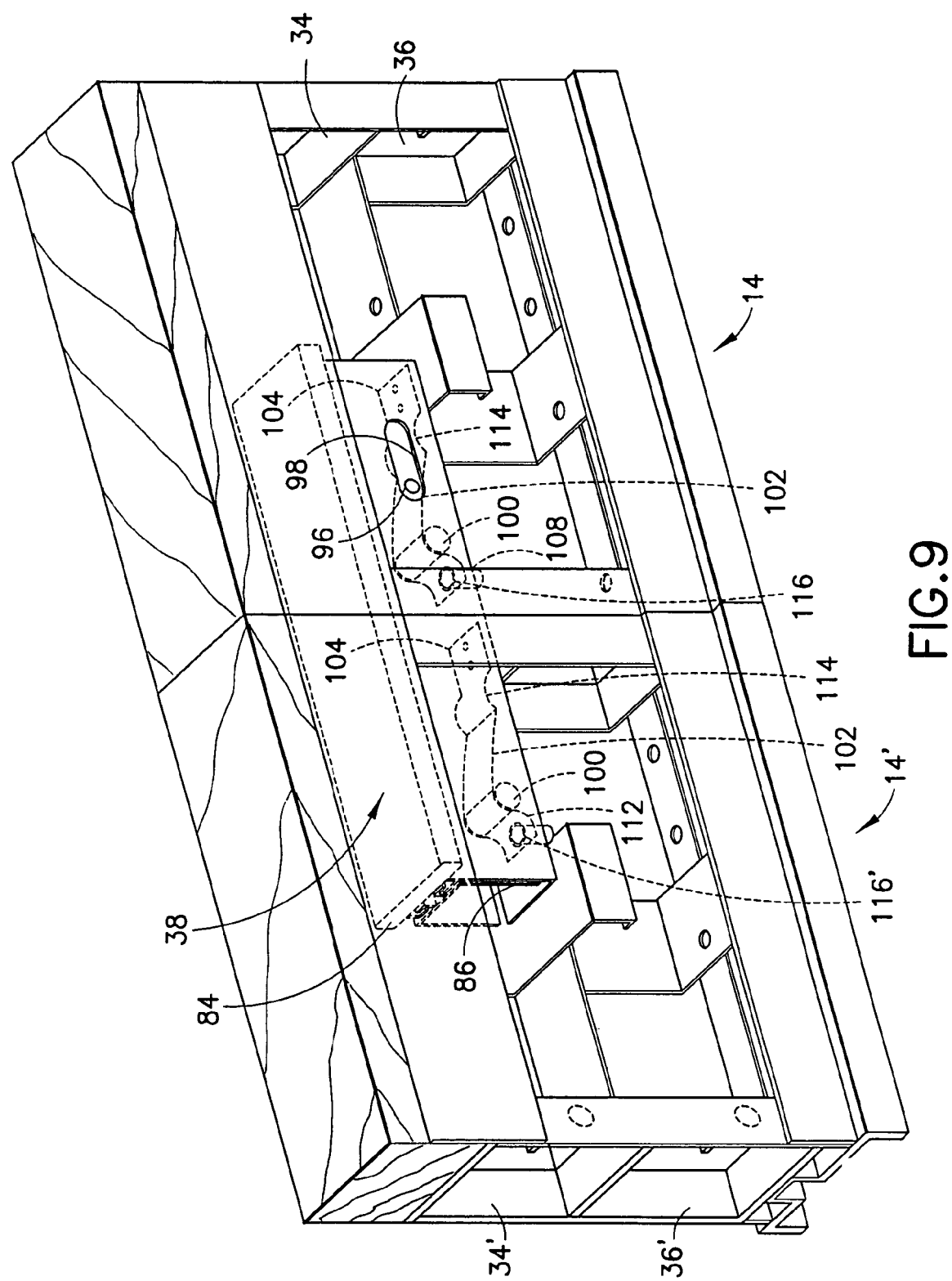
FIG. 9 is a perspective of the top side of the upper sub-panel of FIG. 2, shown in partial breakaway and partial phantom, with the sliding bar thereof securing two adjacent upper sub-panels against relative movement.

Referring now to FIGS. 7 to 9, the operation of the securing assembly of the invention may be understood. Before assembly of modular structure 10, sliding bar 38 is contained completely within a single sub-panel, with only a small length (preferably appx. one-eigth inch) extending from channel 34 to assist in aligning panels during assembly. Post 106 latches into a hole to secure sliding bar 38 against unwanted movement. The length of sliding bar 38 is generally co-extensive with the length of upper sub-panel 14, i.e., about two feet.

First, the user aligns the male side of one sub-panel, with the female side of an adjacent sub-panel. As will be appreciated, since the male end is essentially a rectangle, and the female end is an open slot shaped to receive that rectangle, the two pieces may simply be slipped together, without the need to rotate the two sub-panels into position, or to slide one down the side of the other, rendering this aspect of assembly quite simple.

Next, the user must move a sliding bar (not shown) in the adjacent upper sub-panel 14', to make room for sliding bar 38 from the other upper sub-panel 14.

The user may then align the upper channels 34 and 34' of two adjacent upper sub-panels 14, so that the remaining sliding bar 38 may be slid into place. The user will move sliding bar 38 by placing a key (not shown) in keyhole 96, and using the leverage provided thereby to move sliding lock channel 86 in the direction indicated by arrow 116 which causes sliding lock channel member 86 to slide within U-shaped channel member 84, thereby resulting in bar 100 moving from forward bump 112 and towards rearward bump 114. This movement causes forward end 108 of ribbon spring 102 to move in the direction indicated by arrow 118, thereby moving post 106 out of hole 116 (FIG. 6) into the unlocked position shown in FIG. 7.

When sliding bar 38 is unlocked, it may be moved from its initial position into a second position partly within both adjacent upper sub-panels 14 and 14', as shown in FIG. 9. Once in this position, sliding lock channel member 86 may be moved in the direction indicated by arrow 120 (as shown in FIG. 7) into a locked position in which ribbon spring 102 returns post 106 into the direction shown by arrow 122 and into engagement with a hole 116' of the adjacent sub-panel 14'. At the same time, rearward post 106 may move into the original hole 116 vacated by forward post 106, thereby latching the two adjacent sub-panels together with a minimum of effort.

Figure 10:
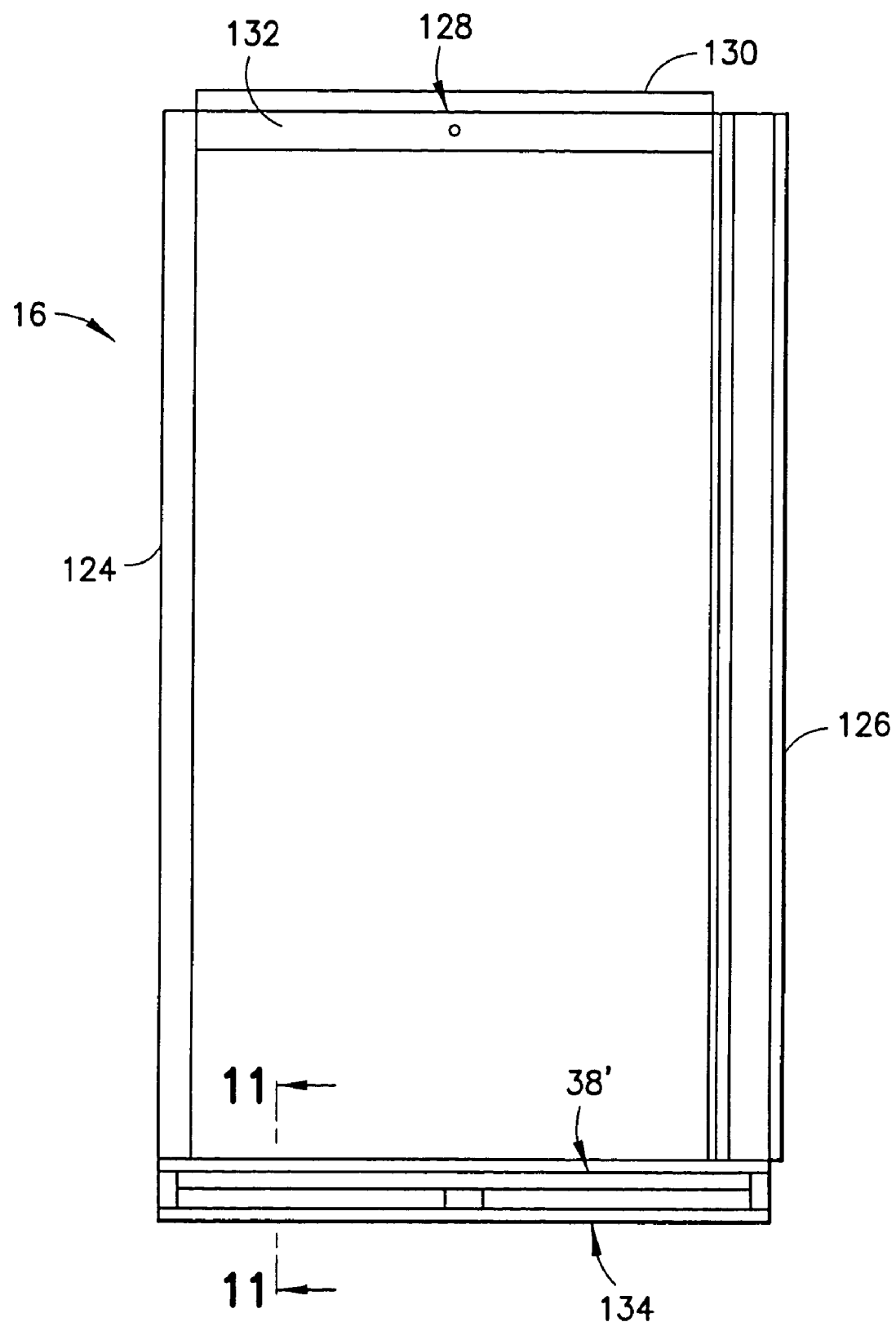
FIG. 10 is a plan view of a lower sub-panel of the modular structure of FIG. 1, shown from the inside of the structure.

Each upper sub-panel 14 is connected to a corresponding lower sub-panel 16. As shown in FIG. 10, each lower sub-panel 16 has a male side 124 which is essentially identical to male side 30 of upper sub-panel, and a female side 126 which is essentially identical to female side 26 of upper sub-panel 14, except only one female side contains a sliding bar, which may be used to join the two female sides in the manner described above. Each lower sub-panel 16 also has an upper side 128, which is a mirror image of lower side 28 of upper sub-panel 14, namely a first alignment portion (on the side of lower sub-panel 16 not visible in FIG. 10) has a tongue 130 which mates with groove 70 in second alignment portion 66 of upper sub-panel 14 (shown in FIG. 5), while a second alignment portion 132 of lower sub-panel 16 has a groove (not shown) which mates with tongue 68 of first alignment portion of upper sub-panel 14. A stop rivet 133 may be provided to limit downward movement of sliding bar 38.

It will be appreciated by those of ordinary skill in the art that other means of coupling the two sub-panels could be employed, but the preferred embodiment has the benefit of permitting the manufacture of only one type of paired attachment portions, thereby streamlining the manufacturing process.

Figure 11:
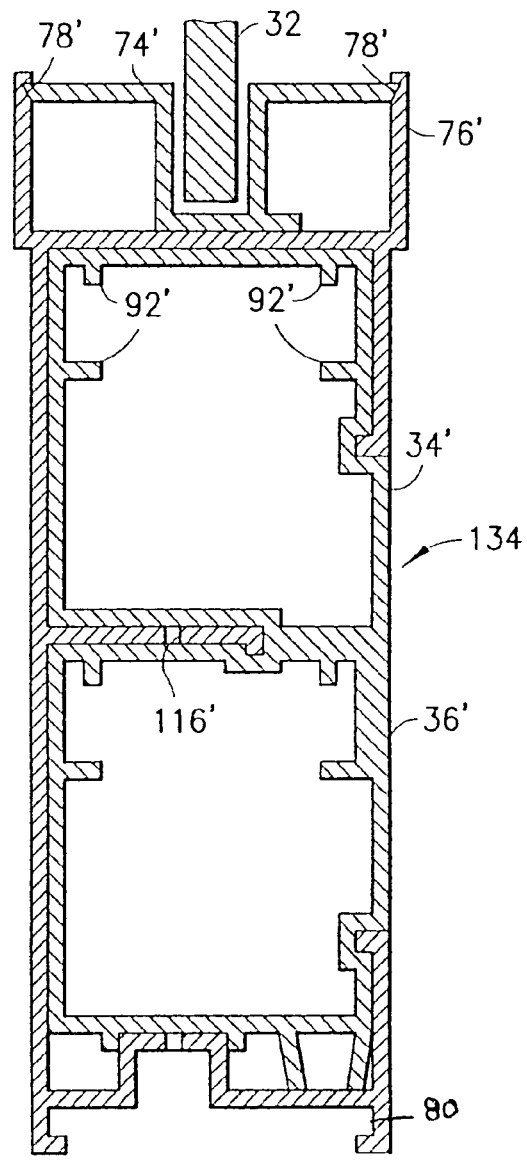
FIG. 11 shows a cross-sectional detail of the bottom side of the lower sub-panel of FIG. 10, taken along the direction of arrows 11-11 in FIG. 10.

The remaining side of lower sub-panel 16, bottom side 134, is shown in FIG. 11. As will be seen, bottom side 134 is substantially similar to top side 24 of upper sub-panel 14 (FIG. 6), and similar elements are designated with a "prime" and will not be separately described (the elements of sliding bar 38' are omitted for clarity). The basic difference between the two components is that the relative position of interior channel 76' and exterior channel 80' are reversed from their counterparts, so that the lower part of lower sub-panel 16 corresponds to the upper part of upper sub-panel 14, and vice-versa, which is to be expected by their relative positions within panel 12. Otherwise, the only substantive difference between the two is that there is no provision for a counterpart for wood 82 at the bottom of lower sub-panel 134, since it is unnecessary.

A modular structure having the connecting assembly as described may offer, therefore, a simpler and easier method of assembly.

Figure 12:
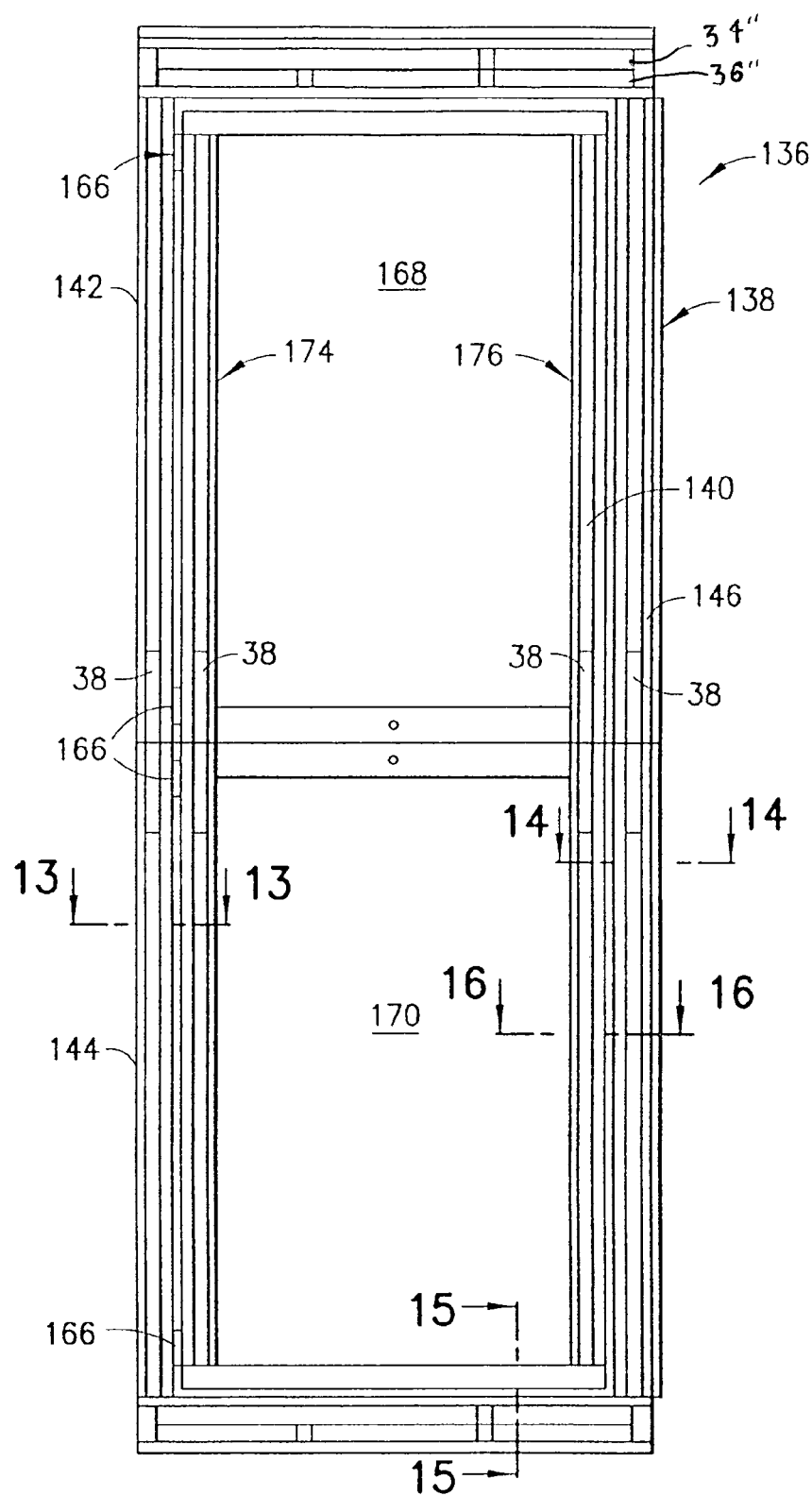
FIG. 12 shows a plan view of a door panel useful with the modular structure of FIG. 1.

In a preferred embodiment, modular structure 10 would include means for permitting access thereto, such as a door 18 (FIG. 1). In the preferred embodiment, however, with panels having a width of only two feet, access would be inconvenient for most, and impossible for some. To provide easier access, an oversized door panel 136, such as shown in FIG. 12 may be provided. Door panel 136 is preferably three feet wide, providing ample room for nearly anyone to access the interior of modular structure. Doors, however, present a new set of problems, namely providing both ease of access by swinging open and closed, and also stability, since the structural integrity of the structure in which the door is mounted must be maintained. In the preferred embodiment, this is accomplished by providing a door frame 138 for holding a door 140. Door frame 138 comprises two substantially U-shaped portions, an upper portion 142, and a lower portion 144. Upper portion 142 of door frame 136 includes upper and lower channels 34" and 36" substantially identical to upper and lower channels 34 and 36, except they are three feet long, rather than two feet long. The bottom of lower portion 144 is likewise similar to bottom side 134 of lower sub-panel 16.

The sides of door frame 136 are slightly different, however, from the male and female sides of panel 12. It is important that door frame 136 be rigid, even without the support of door panels. Accordingly, each side must have its own channel and sliding bar arrangement.

Figure 13:
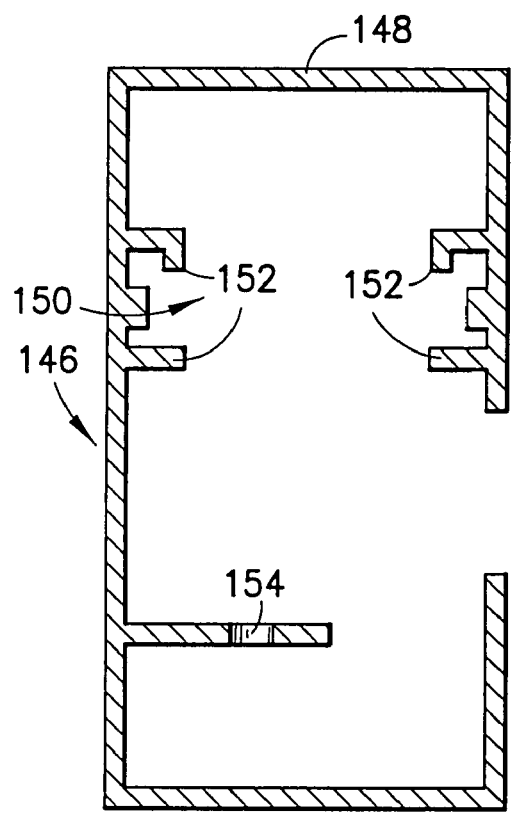
FIG. 13 shows a cross-sectional detail of the male side of a door frame used as part of the door panel of FIG. 12, taken along the direction of arrows 13-13 of FIG. 12.

FIG. 13 shows a male door frame channel 146, having a generally rectangular exterior 148 which is shaped to mate with any female side channel of an adjacent panel according to the invention.

Additionally, male door frame channel 146 includes an interior channel 150 into which a sliding bar similar to sliding bar 38 may be inserted. Interior channel 150 need only be a single channel, and includes supports 152 into which upper shoulder portion 88 of a sliding bar may be inserted during use. Interior channel 150 also includes at least one hole 154 into which a post of the sliding bar (such as post 106 of sliding bar 38) may be inserted for securing the sliding bar against unwanted movement.

Figure 14:
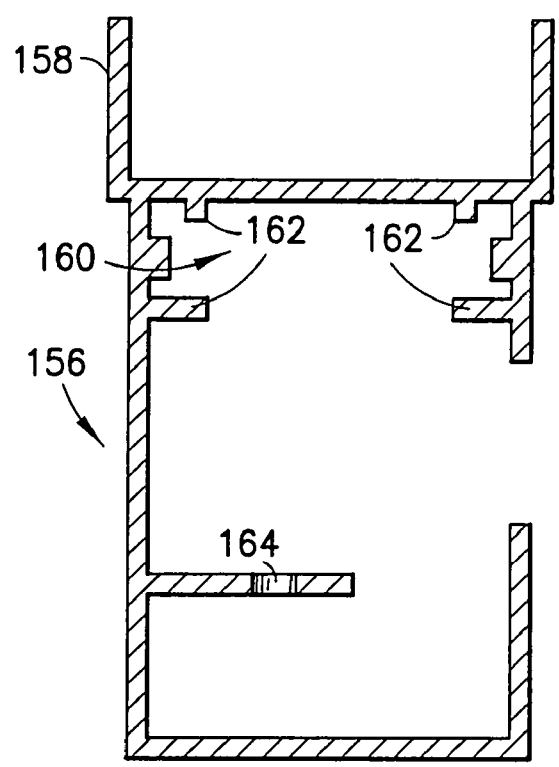
FIG. 14 shows a cross-sectional detail of the female side of a door frame used as part of the door panel of FIG. 12, taken along the direction of arrows 14-14 of FIG. 12.

A female door frame channel 156 is shown in FIG. 14. Female door frame channel 156 includes a female channel 158 which is configured to receive a male channel of any adjacent panel of modular structure 10, an interior channel 160 with supports 162 and a hole 164, all similar to the corresponding parts of male channel 146. As seen in FIG. 12, sliding bars 38 may secure upper and lower portions 142 and 144, respectively, against movement.

Door 140 may be hingedly mounted within door frame 138, by a plurality of standard hinges 166. Hinges 166 may be mounted to permit either left- or right-hand mounting, and inward or outward swinging, as desired. The placement of hinges 166, and the orientation of door 140, is well within the skill of one of ordinary skill in the art.

Figure 15:
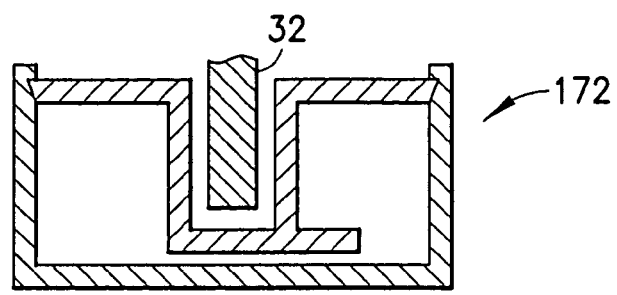
FIG. 15 is a cross-sectional detail of an end cap of a door panel of the embodiment of FIG. 12, taken along the direction of arrows 15-15 thereof.

Door 140 may be manufactured specially as a single unit, or, preferably, may be manufactured as an upper door panel 168 and a lower door panel 170, similar to upper sub-panel 14 and lower sub-panel 16 of panel 12. In this embodiment, upper door panel 168 and lower door panel 170 are joined in the same fashion as upper sub-panel 14 and lower sub-panel 16, and so this connection will not be separately shown. The top of upper door panel 168 and the bottom of lower door panel 170 are simply capped by an end cap 172, as shown in FIG. 15, for gripping the edges of flat sheets 32' and providing a covering for the end thereof.

Figure 16:
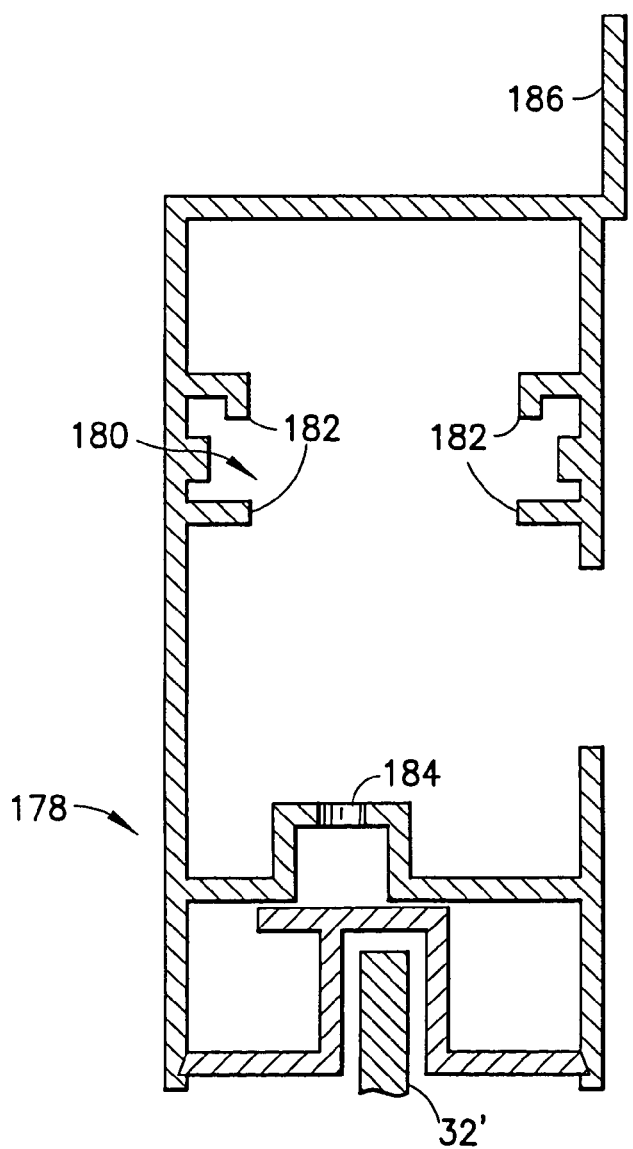
FIG. 16 is a cross-sectional detail of a door side channel of the embodiment of FIG. 12, taken along the direction of arrows 16-16 thereof.

The differences of door 140 lie in left and right sides, 174 and 176, respectively. Each side 174 and 176 includes a door side channel 178 shown in FIG. 16. Door side channel includes an interior channel 180 with supports 182 and a hole 184, all similar to the corresponding parts of male door frame channel 146 and female door frame channel 156. In addition, however, door side channel 178 includes a projection 186, which is used to stop door 140 from swinging through from side to side.

Since door panel 136 is of a different width than the standard panels (three feet versus two feet) if a square or rectangular structure is desired, to compensate for oversized door panel 136, a door could be installed on opposite sides of the structure, two doors could be placed on the same side, or a shorter one-foot panel such as panel 22 in FIG. 1 can be used adjacent door panel 136 so that the combined width of door panel 136 and shorter panel 22 will be equal to the width of a pair of standard panels 12.

A difficulty arises with respect to sliding bars 38 in this scenario of employing a shorter panel. Sliding bars 38 are two feet long, and therefore would extend well beyond the sides of a one-foot panel, so a one-foot sliding bar may be used. Furthermore, because there would not be sufficient room in the upper channel of a one-foot panel for both one half of a two-foot sliding bar and one half of a one-foot bar, the one foot bar is placed in lower channel 36 where it may perform the same function, but in a space where it will not interfere with the operation of the other (two-foot) sliding bar 38.

Figure 17:
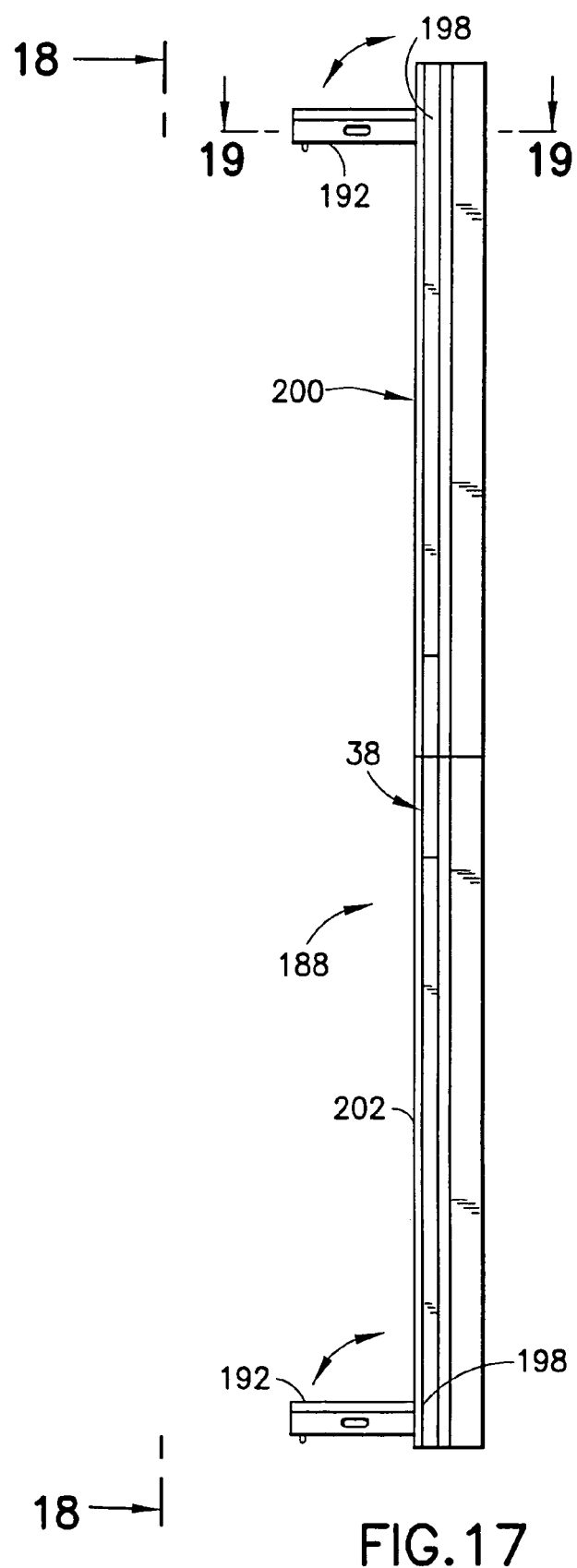
FIG. 17 is a side view of a corner post used in the modular structure of FIG. 1.
Figure 18:
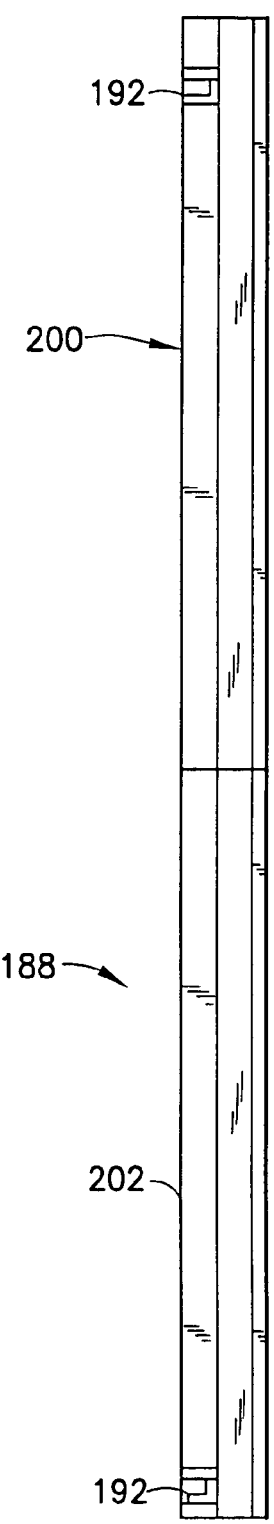
FIG. 18 is a front view of the corner post of FIG. 17, taken along the direction of arrows 18-18 thereof.

The walls of modular structure 10 are connected to one another at their corners by corner posts 188 shown in FIG. 17. The use of sliding bars 38 to connect adjacent panels contemplates sliding panels 12 into place laterally. This is not possible at the corners of the structure. Corner post 188 essentially consists of two components: a female channel 190, and an imitation male channel and sliding bar 192. Female channel 190 may be constructed in either of two ways, as a matter of design choice. First, it could be a purely passive channel for receiving the male side of the panel 12 which will mate therewith, and no connection through the use of sliding bars 38 is attempted. In this case, sliding bar 38 from the mating panel 12 is removed from its upper channel 34, and slid into lower channel 36 for storage, so that it does not interfere with the sliding of sliding bar 38 from the adjacent panel 12.

Figure 19:
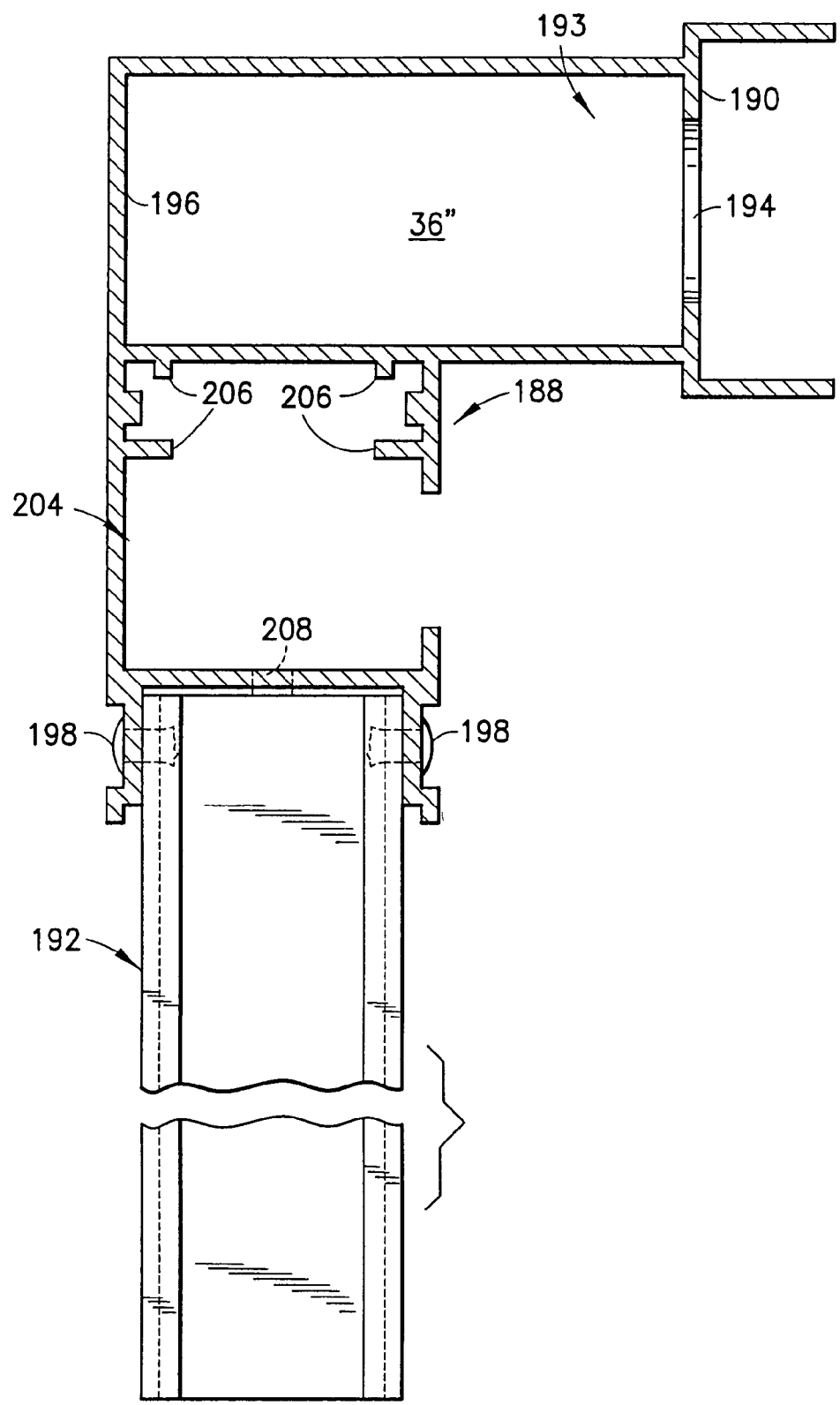
FIG. 19 is a cross-sectional detail of the corner post of FIG. 17, taken along the direction of arrows 19-19 thereof.

Alternatively, channel post 188 could include a slot 194, aligned with lower channel 36, to receive sliding bar 38 therein. Slot 194 would include an abbreviated lower channel 36" for receiving sliding bar 38 therein, so that post 106 would be disposed past slot 194 when the end of sliding bar 38 abuts a rear wall 196 thereof. Since the keyhole of sliding bar 38 (not shown in FIG. 19) would not extend into slot 194, it would still be reachable by the user. This would allow a secure connection of the adjacent panel 12 to corner post 188 and convenient access for moving sliding bar 38 when desired.

Imitation male channel 192 is preferably pivotably mounted to corner post 188, at a pivot point 198, so that it may be stored in a position in which imitation male channel 192 does not extend outwardly prior to actual use. Imitation male channel 192 is configured as sliding bar 38, and is positioned to extend into either upper channel 34 or lower channel 36, as a matter of design choice, since it is shorter than a standard sliding bar 38, and will therefore not likely interfere with the operation of any sliding bar in either channel. Preferably, lower channel 36 is used for consistency.

Corner post 188 may also be made of upper and lower portions, 200 and 202, respectively, joined by a sliding bar 38, as shown in FIG. 17. To this end, corner post 188 also includes an interior channel 204 with supports 206 and a hole 208 (shown in phantom), all similar to the corresponding parts of male door frame channel 146 and female door frame channel 156.

Figure 20:
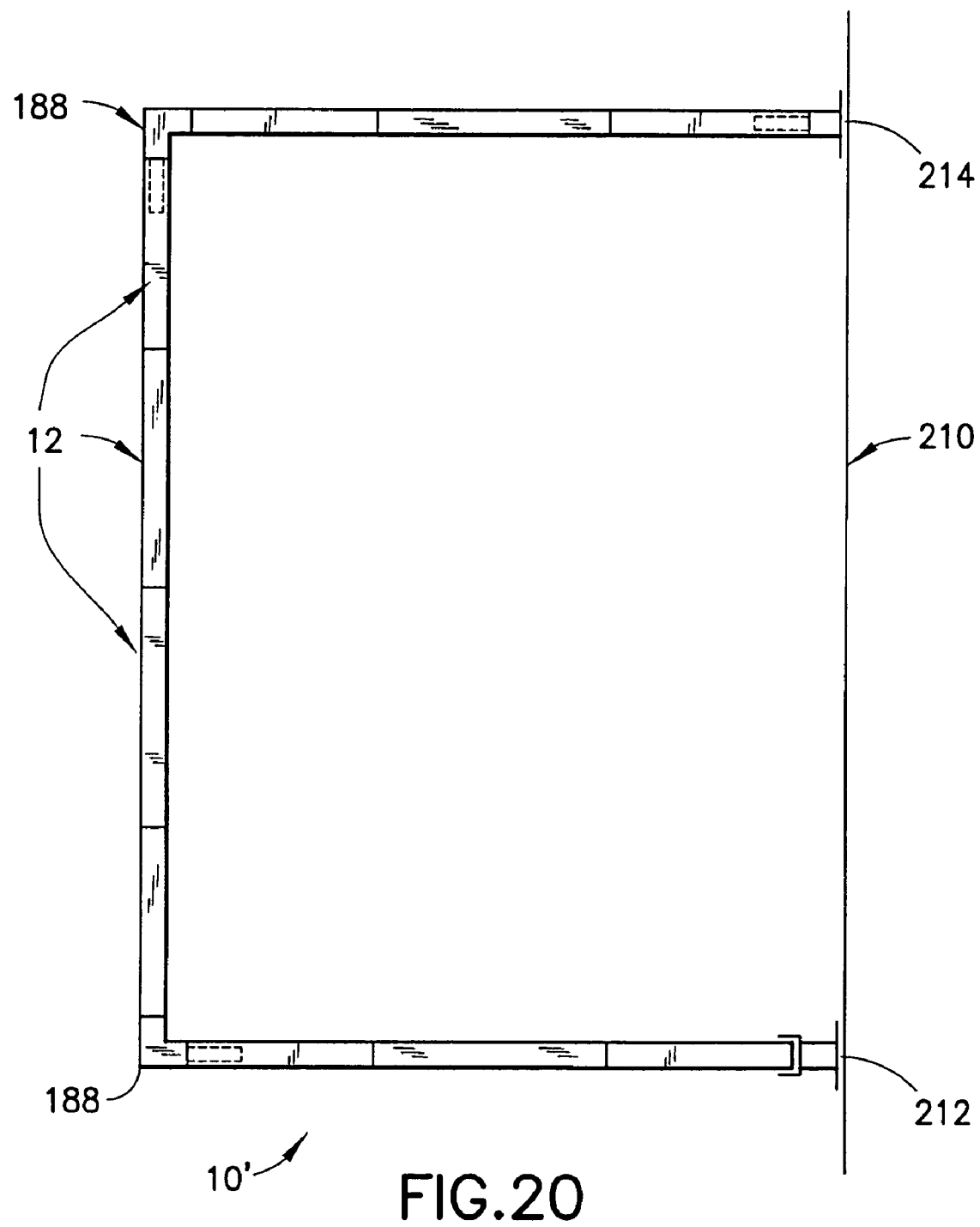
FIG. 20 is a top view of a modified modular structure in accordance with the invention, in which the modified modular structure is attached to another structure.

A further embodiment of the invention is shown in FIG. 20. In this embodiment, a modular structure 10, shown from above, is mounted to at least one existing wall 210, in which case modular structure 10' will not be a freestanding structure. Modular structure 10' includes a plurality of panels 12, and corner posts 188, establishing three sides of a modular structure 10' (doors are omitted for ease of representation, and, in any event, access may be had through existing wall 210, if desired).

Figure 21:
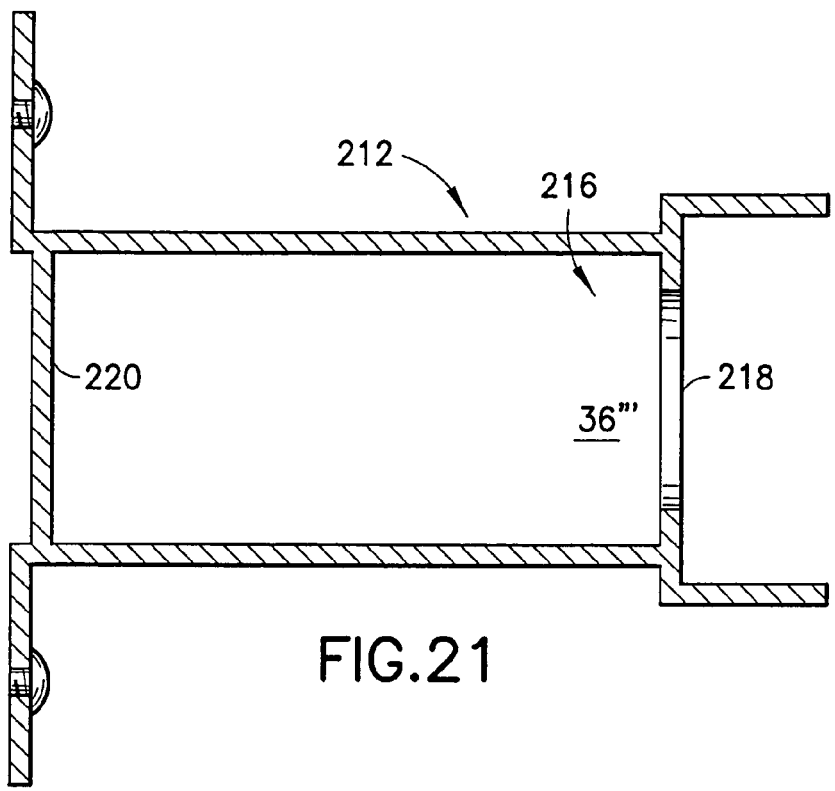
FIG. 21 is a cross-sectional detail of a female wall adapter used in the embodiment of FIG. 20.

To attach modular structure 10 to existing wall 210, a pair of adapters is required, a female adapter 212 and a male adapter 214, which are secured to existing wall 210. Female adapter 212 shown in FIG. 21, may be constructed in either of two ways, as a matter of design choice, in a fashion similar to that of female channel 190 corner post 188. First, it could be a purely passive channel for receiving the male side of the panel 12 which will mate therewith, and no connection through the use of sliding bars 38 is attempted. In this case, sliding bar 38 from the mating panel 12 is removed from its upper channel 34, and slid into lower channel 36 for storage, so that it does not interfere with the sliding of sliding bar 38 from the adjacent panel 12. Alternatively, female adapter 212 could include a mating connection 216, aligned with lower channel 36, to receive sliding bar 38 therein. Mating connection 216 would include an abbreviated lower channel 36''', a slot 218 and a rear wall 220 therein, and will receive post 106 of sliding bar 38, as described above. Since the keyhole of sliding bar 38 (not shown) would not extend into mating connection 216, it would still be reachable by the user. This would allow a secure connection of the adjacent panel 12 to female adapter 212.

Figure 22:
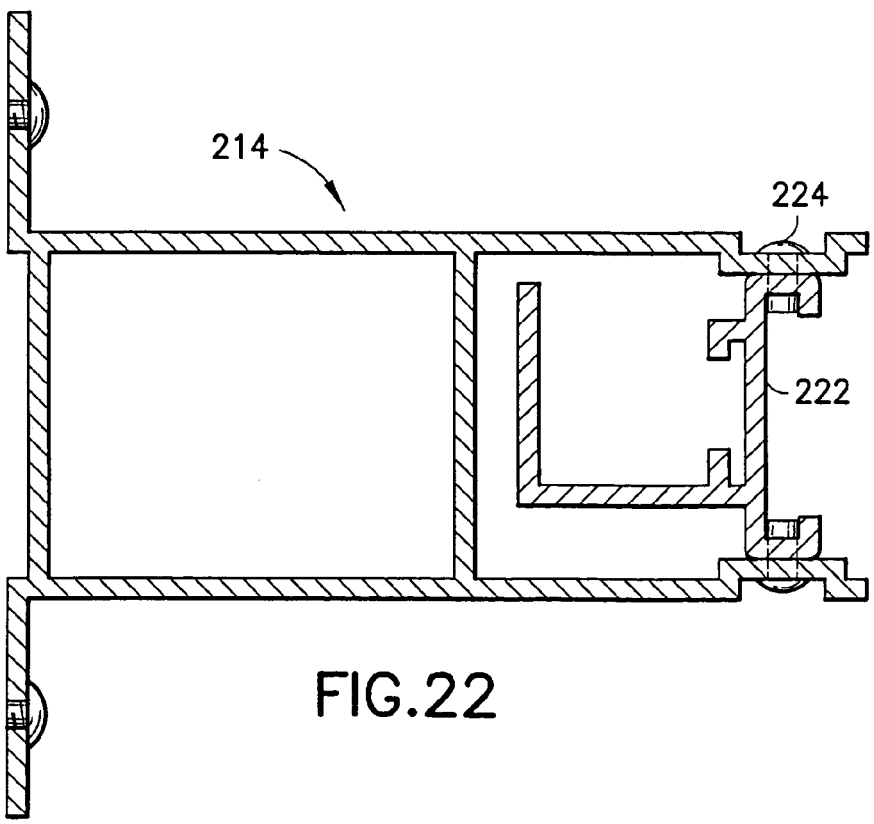
FIG. 22 is a cross-sectional detail of a male wall adapter used in the embodiment of FIG. 20.

FIG. 22 shows a male adapter 214, in which an imitation male connector 222 is pivotably mounted about a pivot point 224 in male adapter 214. Imitation male connector 222 is configured as sliding bar 38, so that it will mate with the female side of the panel 12 which is to be connected thereto.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

In other examples, the roof structure illustrated in FIG. 1 is not the only contemplated roofing structure. A Succoth, for example may have no roof whatsoever, and, if it does, may have a simple flat roof. The nature of the roof plays no part in the instant invention. In another example, every slidable bar has been described as being identical, but it is possible that, in some preferred embodiments, the slidable bars may be different. For example, in some embodiments, it may be desirable to lessen the weight of the slidable bar, and lower its cost, by making its upper portion hollow, while maintaining the same overall profile.

It will further be appreciated by those of ordinary skill that the use of sub-panels is purely optional. It would be possible to make a structure using only individual panels having whatever shape and size as may be desired. The shape of, the panels is also something that may be varied, depending upon the application. The use of sub-panels, however, simplifies the storage and shipping of a disassembled structure, since most of the pieces of modular structure 10 will be of generally uniform size: roughly two feet by three and one-half feet. The few special panels, such as doors, one-foot panels, corner posts, and wall adapters, may be shipped conveniently as well, with only the door sub-panels being outsized.

Furthermore, various changes may be made to the sub-panels, as well. Rather than having a single panel separated in half horizontally, it could be made up of any number of sub-panels, including divided vertically, thereby increasing the flexibility of the height of the overall structure constructed thereby. Any additional sub-panels may have top and bottom edges which mate with the appropriate edge of an adjacent sub-panel, rather than mating with adjacent panels.

It will also be appreciated that sheet 32 need not be flat, depending upon the application for which the structure is intended. Sheet 32 may be made in any convenient shape, such as, for example, hemispherical, wavy, curved or irregular, so long as it has the requisite edges. Similarly, as shown in FIG. 1, panels 12 may be of shapes other than rectangular, such as triangular roof support panels 226 or pentagonally shaped panel 228.

Modular structure 10 preferably has a roof, generally 230 in FIG. 1, which may be of any desired construction, such as flat, arched, gabled, etc. In many instances, roof 230 may be supported on the top of structure 10, and affixed thereto by means of sliding bars and channels as with panels 12 themselves. Alternatively, roof 230 may be supported by other means, as is commonly known in the art. For example, separate supports may be provided for supporting a roof, such as wooden cross-beams, cables, or other well-known structures. The choice of a suitable roofing support structure is well within the knowledge of one of ordinary skill in the art, depending upon the particular environment in which structure 10 may be utilized.

Finally, it will be appreciated that, although structure 10 is described with moving parts accessible from interior thereof, in some applications, such as booths for trade shows, it may be preferred for the interior of the structure to be flat, and that access to the moving parts is on the exterior of the structure. This is purely a matter of design choice.

Structure 10 is a highly versatile arrangement with many applications, and the invention herein described is therefore only to be considered limited by the appended claims.

What is claimed is:

1. A panel for use in constructing a modular structure, comprising a surface having at least three edges, at least one of said edges being one of a male edge and a female edge, said female edge having a channel formed therein, and said male edge having a protrusion formed therein, said protrusion being shaped to mate with a channel formed in a female edge of another panel;

a latching edge transverse to said at least one of said male edge and said female edge, said latching edge including at least one channel therein, said at least one channel extending along said latching edge;

a first slidable latch disposed at least partly within said channel in said latching edge, and positioned to slide along said channel in said latching edge between a first position substantially completely within said channel disposed in said latching edge and a second position partly within said channel in said latching edge and partly outside of said channel in said latching edge;

said channel being positioned to receive a second latch of another panel; and means for releasably securing at least one of said first slidable latch and said second latch within said at least one channel in said latching edge, said means for releasably securing including at least one engagement means in said channel for engaging said at least one of said first slidable latch and said second latch;

wherein said first slidable latch includes a first movable post, and wherein said engagement means includes at least one aperture for receiving said first movable post, whereby said first slidable latch is secured against movement relative to said panel by moving said first movable post into said at least one aperture;

wherein said engagement means includes at least a first and a second aperture, each configured to receive said first movable post, whereby said slidable latch is secured in said first position by moving said first movable post into said first aperture, and secured in said second position by moving said first movable post into said second aperture; and wherein said means for releasably securing includes a sliding member disposed within said slidable latch, and capable of actuating the movement of said movable post by sliding from a first position in which said movable post is in said first position thereof to a second position in which said movable post is in said second position thereof.

2. The panel of claim 1, wherein said panel has four edges.

3. The panel of claim 2, wherein said panel has both said female edge and said male edge.

4. The panel of claim 3, wherein said female edge and said male edge are substantially parallel.

5. The panel of claim 4, wherein said latching edge is transverse to both said male edge and said female edge.

6. The panel of claim 5, wherein said latching edge extends substantially completely between said male edge and said female edge.

7. The panel of claim 1 wherein said at least one channel in said latching edge comprises an upper channel and a lower channel.

8. The panel of claim 7, wherein said first position of said slidable latch is within said upper channel.

9. The panel of claim 8, wherein said second position of said slidable latch is partly within said upper channel, and partly outside of said upper channel.

10. The panel of claim 9, wherein said second position of said slidable latch is approximately one-half within said upper channel, and one-half outside of said upper channel.

11. The panel of claim 7, wherein said first position of said slidable latch is within said lower channel.

12. The panel of claim 11, wherein said second position of said slidable latch is partly within said lower channel, and partly outside of said lower channel.

13. The panel of claim 12, wherein said second position of said slidable latch is approximately one-half within said lower channel, and one-half outside of said lower channel.

14. The panel of claim 1, wherein at least one of said edges is non-linear.

15. The panel of claim 14, wherein said at least one of said edges is angled.

16. The panel of claim 14, wherein said at least one of said edges is curved.

17. The panel of claim 1 further comprising: means for actuating said first movable post to selectively engage and disengage said aperture, whereby said slidable latch is capable of movement within said at least one channel when said first movable post is disengaged from said aperture, and said slidable latch is secured against movement within said at least one channel when said first movable post is engaged with said aperture.

18. The panel of claim 1, wherein said slidable latch further includes a second movable post, and said second movable post is positioned to engage one of said at least said first and second apertures of an adjacent panel when said slidable latch is in said second position.

19. The panel of claim 1, wherein said means for releasably securing includes a spring for selectively urging said movable post into one of said first position and said second position thereof; wherein said sliding member contacts said spring, and moves said spring from a first position in which said spring urges said movable post into said first position thereof, to a second position in which said spring urges said movable post into said second position thereof.

20. The panel of claim 1, wherein said means for releasably securing includes a spring button.

21. The panel of claim 1, wherein said means for releasably securing includes a lock.

22. The panel of claim 1, wherein said surface includes a door.

23. The panel of claim 1, wherein said surface includes a window.

24. The panel of claim 1, wherein said surface includes first and second sub-panels, said first and second subpanels being releasably secured to each other.

25. The panel of claim 24, wherein said first and second sub-panels are releasably secured to each other by a third slidable latch capable of moving from a first position substantially completely within said first subpanel to a second position partly within said first subpanel and partly within said second sub-panel.

26. A modular structure comprising:
a plurality of panels, each of said plurality of panels comprising: a surface having at least three edges, at least one of said edges being one of a male edge and a female edge, said female edge having a channel formed therein, and said male edge having a protrusion formed therein, said protrusion being shaped to mate with a channel formed in a female edge of another of said plurality of panels, a latching edge transverse to said at least one of said male edge and said female edge, said latching edge including at least one channel therein, said at least one channel extending along said latching edge, a first slidable latch disposed at least partly within said channel in said latching edge, and positioned to slide along said channel in said latching edge between a first position substantially completely within said channel in said latching edge and a second position partly within said channel in said latching edge and partly within said at least one channel in said latching edge in an adjacent one of said plurality of panels, a second latch of another of said plurality of panels being receivable within said at least one channel in said latching edge, and means for releasably securing at least one of said first slidable latch and said second latch within said at least one channel in said latching edge,
wherein said structure is constructed by latching together adjacent ones of said plurality of panels by one of moving said slidable latch of one panel into said second position at least partly within an adjacent one of said plurality of panels, and receiving within one of said panels said second latch from an adjacent one of said plurality of panels
wherein said means for releasably securing of each of said plurality of panels includes at least one engagement means in said channel for engaging said at least one of said first slidable latch and said second latch thereof;
wherein said slidable latch of each of said plurality of panels includes a first movable post, and wherein said engagement means of each of said plurality of panels includes at least one aperture for receiving said first movable post thereof, whereby said slidable latch of each of said plurality of panels is secured against movement relative to said panel by moving said first movable post into said at least one aperture thereof;
wherein said engagement means of each of said plurality of panels includes at least a first and a second aperture, each configured to receive said first movable post thereof, whereby said slidable latch of each of said plurality of panels is secured in said first position thereof by moving said first movable post into said first aperture thereof, and secured in said second position by moving said first movable post into said second aperture thereof; and
wherein said means for releasably securing of each of said plurality of panels includes a sliding member disposed within said slidable latch thereof, and capable of actuating the movement of said movable post by sliding from a first position thereof in which said movable post is in said first position thereof to a second position in which said movable post is in said second position thereof.

27. The structure of claim 26, wherein each of said plurality of panels has four edges.

28. The structure of claim 27, wherein each of said plurality of panels has both said female edge and said male edge.

29. The structure of claim 28, wherein said female edge and said male edge of a single panel of said plurality of panels are substantially parallel.

30. The structure of claim 29, wherein said latching edge of each of said plurality of panels is transverse to both said male edge and said female edge thereof.

31. The structure of claim 30, wherein said latching edge of each of said plurality of panels extends substantially completely between said male edge and said female edge thereof.

32. The structure of claim 26, wherein said at least one channel in said latching edge of each of said plurality of panels comprises an upper channel and a lower channel.

33. The structure of claim 32, wherein said first position of said slidable latch of each of said plurality of panels is within said upper channel thereof.

34. The structure of claim 33, wherein said second position of said slidable latch of each of said plurality of panels is partly within said upper channel thereof, and partly outside of said upper channel thereof.

35. The structure of claim 34, wherein said second position of said slidable latch of each of said plurality of panels is approximately one-half within said upper channel thereof, and one-half outside of said upper channel thereof.

36. The structure of claim 32, wherein said first position of said slidable latch of each of said plurality of panels is within said lower channel thereof.

37. The structure of claim 36, wherein said second position of said slidable latch of each of said plurality of panels is partly within said lower channel thereof, and partly outside of said lower channel thereof.

38. The structure of claim 37, wherein said second position of said slidable latch of each of said plurality of panels is approximately one-half within said lower channel thereof, and one-half outside of said lower channel thereof.

39. The structure of claim 26, wherein at least one of said edges of each of said plurality of panels is nonlinear.

40. The structure of claim 39, wherein said at least one of said edges of each of said plurality of panels is angled.

41. The structure of claim 39, wherein said at least one of said edges of each of said plurality of panels is curved.

42. The structure of claim 26 further comprising:
means for actuating said first movable post of each of said plurality of panels to selectively engage and disengage said aperture thereof, whereby said slidable latch of each of said plurality of panels is capable of movement within said at least one channel thereof when said first movable post is disengaged from said aperture thereof, and said slidable latch is secured against movement within said at least one channel thereof when said first movable post is engaged with said aperture thereof.

43. The structure of claim 26, wherein said slidable latch of each of said plurality of panels further includes a second movable post, positioned to engage one of said at least said first and second apertures of an adjacent panel when said slidable latch is in said second position.

44. The structure of claim 26, wherein said means for releasably securing of each of said plurality of panels includes a spring for selectively urging said movable post into one of said first position and said second position thereof; and
wherein said sliding member of each of said plurality of panels contacts said spring thereof, and moves said spring from a first position in which said spring urges said movable post into said first position thereof, to a second position in which said spring urges said movable post into said second position thereof.

45. The structure of claim 26, wherein said means for releasably securing of each of said plurality of panels includes a spring button.

46. The structure of claim 26, wherein said means for releasably securing of each of said plurality of panels includes a lock.

47. The structure of claim 26, wherein said surface of at least one of said plurality of panels includes a door.

48. The structure of claim 26, wherein said surface of at least one of said plurality of panels includes a window.

49. The structure of claim 26, wherein said surface of at least one of said plurality of panels includes first and second sub-panels, said first and second sub-panels being releasably secured to each other.

50. The structure of claim 49, wherein said first and second sub-panels are releasably secured to each other by a third slidable latch capable of moving from a first position substantially completely within said first sub-panel to a second position partly within said first sub-panel and partly within said second sub-panel.

* * * * *